United States Patent
Haimoff

(10) Patent No.: US 8,696,967 B2
(45) Date of Patent: Apr. 15, 2014

(54) METHOD AND SYSTEM FOR HIGH PRESSURE INJECTION OVERMOLDING

(75) Inventor: Efraim Haimoff, Mevazeret Zion (IL)

(73) Assignee: Keter Plastic Ltd., Herzelia (IL)

( * ) Notice: Subject to any disclaimer, the term of this patent is extended or adjusted under 35 U.S.C. 154(b) by 656 days.

(21) Appl. No.: 12/736,498

(22) PCT Filed: Apr. 6, 2009

(86) PCT No.: PCT/IB2009/051436
§ 371 (c)(1),
(2), (4) Date: Mar. 31, 2011

(87) PCT Pub. No.: WO2009/144593
PCT Pub. Date: Dec. 3, 2009

(65) Prior Publication Data
US 2011/0174411 A1    Jul. 21, 2011

Related U.S. Application Data

(60) Provisional application No. 61/071,153, filed on Apr. 15, 2008.

(51) Int. Cl.
*B29C 45/14* (2006.01)
*A61F 2/82* (2013.01)

(52) U.S. Cl.
USPC ............... 264/279; 264/259; 264/279.1

(58) Field of Classification Search
USPC ....................................... 264/271.1
See application file for complete search history.

(56) References Cited

U.S. PATENT DOCUMENTS

| | | | |
|---|---|---|---|
| 2,079,393 A * | 5/1937 | Benge | 249/59 |
| 2,160,108 A * | 5/1939 | Reid | 264/513 |
| 3,298,558 A | 1/1967 | Nichol | |
| 3,458,619 A * | 7/1969 | Prochaska | 264/261 |
| 3,592,887 A | 7/1971 | Edwards | |
| 3,807,692 A * | 4/1974 | Usab et al. | 251/315.15 |
| 4,180,542 A * | 12/1979 | Wrasman | 264/242 |
| 4,237,089 A * | 12/1980 | Kubat et al. | 264/328.1 |
| 5,008,064 A * | 4/1991 | Sorensen | 264/308 |
| 6,287,501 B1 | 9/2001 | Rowley | |
| 6,939,591 B2 | 9/2005 | Hutchinson et al. | |
| 2001/0045104 A1 | 11/2001 | Bailey, Sr. et al. | |
| 2003/0032339 A1 | 2/2003 | Bell et al. | |
| 2004/0086329 A1 | 5/2004 | Sorrentino | |
| 2005/0025922 A1 | 2/2005 | Rydin et al. | |
| 2007/0071929 A1 | 3/2007 | Haimoff | |

FOREIGN PATENT DOCUMENTS

| | | |
|---|---|---|
| DE | 19718096 | 11/1998 |
| JP | 7032413 | 2/1995 |

OTHER PUBLICATIONS

International Search Report for PCT/IB2009/051436 dated Oct. 1, 2009.

* cited by examiner

*Primary Examiner* — Matthew Daniels
(74) *Attorney, Agent, or Firm* — Eitan, Mehulal & Sadot

(57) ABSTRACT

An apparatus for supporting a tube during plastic injection overmolding, the apparatus comprising at least one rod adapted to support essentially the entirety of an inner surface of a tube during at least a part of a plastic injection overmolding process for coating at least a portion of an outer surface of the tube.

12 Claims, 10 Drawing Sheets

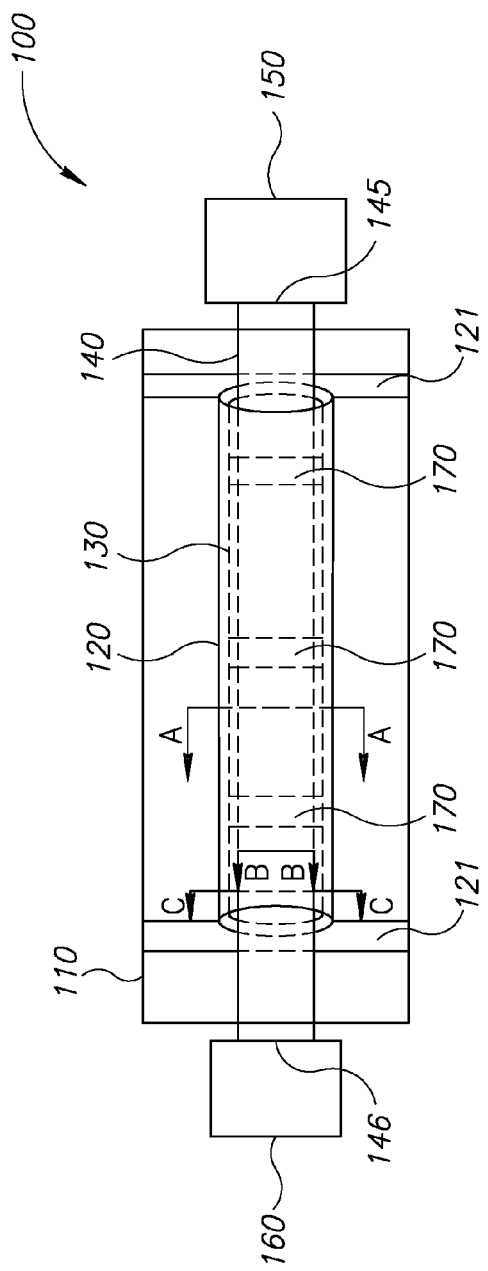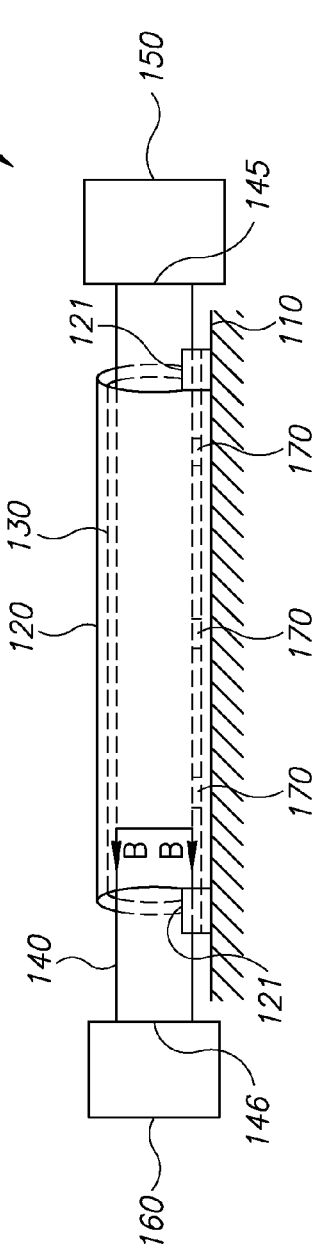

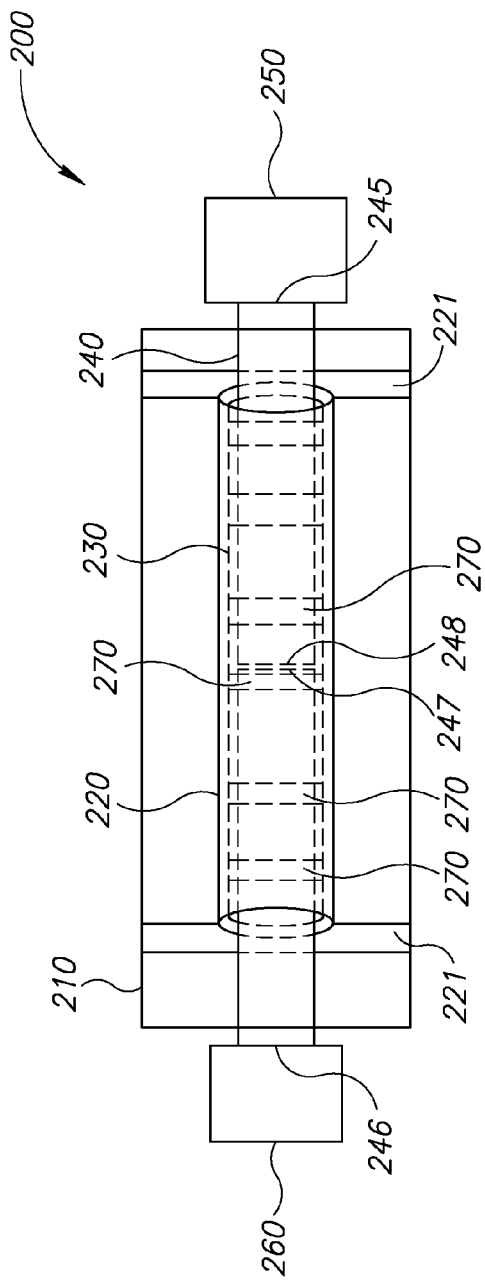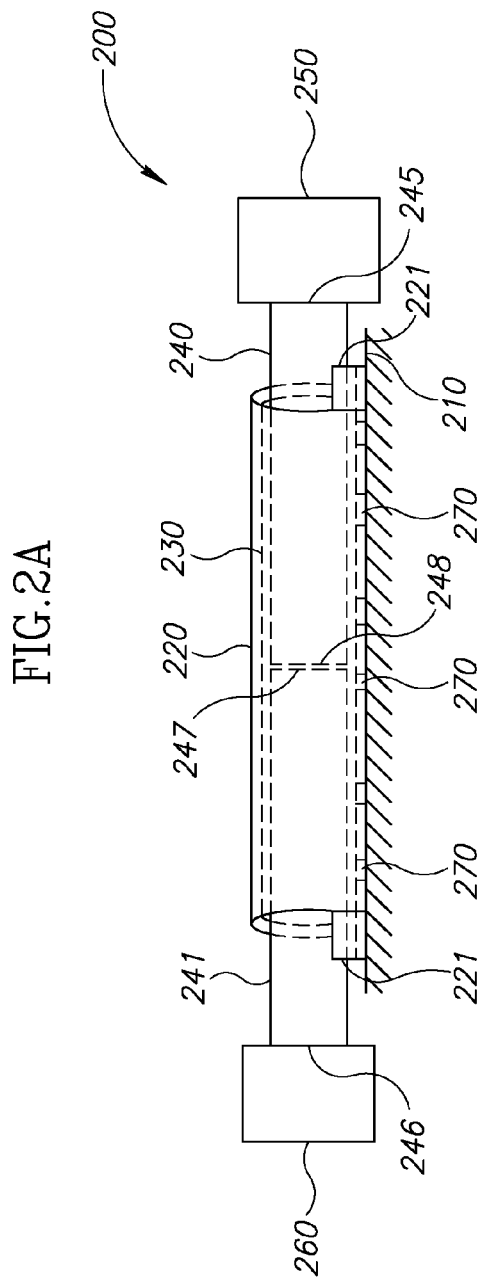

METHOD AND SYSTEM FOR HIGH PRESSURE INJECTION OVERMOLDING

This patent application is a National Phase filing of, and claims priority and benefit from, PCT International Patent Application Number PCT/IB2009/051436, titled "System for High Pressure Injection Overmolding", filed on Apr. 6, 2009, published on Dec. 3, 2009 as International Publication Number WO 2009/144593, which is hereby incorporated by reference in its entirety; and which, in turn, claims priority and benefit from U.S. Provisional Patent Application No. 61/071,153, titled "System for High Pressure Injection Overmolding", filed on Apr. 15, 2008, which is hereby incorporated by reference in its entirety.

FIELD

The disclosure relates to structurally reinforced, molded plastic parts.

BACKGROUND

Injection overmolding generally comprises coating a substrate placed inside a mold with a liquid, powder and/or slurry plastic (hereinafter referred to as "molten plastic") at relatively high temperatures. The molten plastic is usually injected into the mold at high pressures or at low pressures, depending on the application and the type of substrate. Low pressure injection overmolding is typically done with injection pressures ranging from 10-40 MPa (100-400 bar), while high pressure injection overmolding is typically done with injection pressures ranging from 80-200 MPa (800-2000 bar). Generally, for structurally reinforced, molded plastic parts, the substrate may comprise a tube, a profile, or some other shaped, rigid element adapted to resist the high temperatures and pressures associated with injection overmolding.

There are advantages to using high pressure injection overmolding in the fabrication of structurally reinforced, molded plastic parts. For example, moduli of elasticity, impact resistance, puncture resistance, and other mechanical characteristics, are substantially improved in reinforced parts produced by high pressure injection overmolding compared with parts produced by low pressure injection overmolding. Additionally, thickness of a plastic coating may be substantially reduced when using high-pressure injection overmolding, providing for a relative saving in manufacturing costs while also maintaining anticorrosion characteristics.

Generally, substrate design requirements include a use of profiles which are rigid, lightweight, and fabricated from relatively inexpensive materials. Furthermore, the profiles are generally required to be of sufficient strength to not deform and/or suffer other mechanical degradations, as a result of a force with which the molten plastic strikes the profiles when injected into the mold at high pressure. Usually, in order to prevent deformations and/or other mechanical degradations, profiles with relatively thick walls, for example. greater than 3 mm are typically used. The use of profiles with relatively thick walls is generally a problem as the profiles may have a tendency to be relatively heavy in weight.

US Patent Application Publication No. 2007/0071929 A1, "Molded Article with Metal Reinforcing and Method for its Manufacture", incorporated herein by reference, describes "a composite article comprises a channel-shaped metal reinforcing element and molded plastic shell including a portion formed as a wall mechanically closing the open side of the channel shape. The reinforcing element may include a plurality of open channels each of them being closed by a portion of the plastic coating. Constructive elements comprising at least two such composite articles may be manufactured, for example a flat panel made of parallel elongated beams. A method for manufacturing the composite article in an assembly mold includes inserting a mold core in the metal reinforcing element via the open side of the channel transversely to the channel axis, assembling all parts of the mold, molding of the plastic coating, disassembling the mold; and removing the mold core from the composite article in direction parallel to the channel axis."

European Patent Application EP 1238773 A1, "System for Overmolding Tubes in Plastic Parts", incorporated herein by reference, describes a "system for overmoulding tubes in plastic parts, in which a tube, generally metallic and thin, is housed in the interior or a mould for its overmoulding, in that the tube is arranged on the supports in the said interior of the mould ins in that the filling is carried out with the plastic material in order to obtain a plastic structure in which the tube is fastened to the said structure, with the interior of the tube being completely free of any plastic material at the end of the overmoulding due to its being closed during the process, which is characterized in that while the overmoulding of the tube is taking place, means are provided in the interior of the tube to keep the shape of the tube unalterable by withstanding the external pressure exerted by the plastic material, with the application of these means being maintained until the part has been cooled and then proceeding to remove them once the part has been finished."

Japanese Patent Publication No. 63141713 A, "Suction Pipe Made of Synthetic Resin for Engine and its Manufacture", incorporated herein by reference, describes a method "to enable the suction path having two dimensional or mote complicated shape which is not capable of molding by injection molding to be achieved, while enabling ensuring the shape and the surface accuracy of a flange part which is not capable of molding by flow molding to be achieved by means of using the core in which the blow molding becoming the suction path of inner layer after molding is filled with sand, etc." A drawback with the method described may be the possible combining of sand with the melted plastic, which may affect the surface finish of the reinforced part. To avoid this, tight production controls may be required, possibly resulting in increased production costs and production time.

SUMMARY

An aspect of some embodiments of the disclosure relates to providing a system and method for high pressure injection overmolding of relatively thin-walled rigid substrates.

According to an aspect of some embodiments of the disclosure, a structural insert (rod) is slidingly inserted inside a closed, or essentially closed, profile (tube) placed inside a high pressure injection mold, the structural insert adapted to distribute pressure (forces) acting on profile walls during high pressure injection overmolding, over the whole of, or optionally a portion of, the insert, such that deformation of the profile is substantially prevented. A deformation amplitude in the profile due to the injection pressure is maintained to a maximum of about 1 mm, substantially in the order of magnitude of a clearance between the insert and the profile, which may generally range from 0.05 mm-1 mm, and substantially less than that achieved through other methods known in the art. This allows for a better finished product, for example, in applications where an object may be inserted in the profile. For example, a connector to be inserted at ends of profiles which are to be joined together may be inserted with ease as the deformations in the profiles are relatively small and do not interfere with the insertion. The relatively small clearance substantially prevents molten plastic from flowing into the space between the insert and the profile, which and may warp the profile walls.

According to an aspect of some embodiments of the disclosure, the use of a structural insert, adapted to exert an equal and opposing pressure to that resulting from the injection overmolding, substantially allows for the use of substantially thin-walled closed, or essentially closed, profiles. For example, profile wall thickness may be 0.1 mm or greater. Profiles of wall thickness between 0.1-1 mm are generally readily available in markets, and relatively easy to obtain. Additionally, the use of thin-walled closed profiles allow for the manufacture of lighter-weight products.

The profile may be a rigid closed, or essentially closed, metal tube, and may comprise a cross-section of substantially any geometrical shape, such as, for example, circular, elliptical, quadrilateral, pentagonal, hexagonal, heptagonal, octagonal, or other polygonal shape with more than eight sides, or any combination thereof. The structural insert may be fabricated from any material adapted to resist temperatures of, for example, 230-250 degrees Celsius, and up to approximately 300 degrees Celsius, typically associated with high pressure injection overmolding processes. Examples of some materials adapted to resist the high temperatures may be metal, metal alloys, ceramic, composites, and others. Furthermore, the structural insert may comprise a solid cross-sectional shape substantially similar to an inner cross-section of the profile, and which may be referred to hereinafter as a "solid insert". Optionally, the insert may comprise a non-solid cross-sectional shape, and which may be referred to hereinafter as a "non-solid insert". Additionally or alternatively, the structural insert may comprise a cross-sectional shape different than the inner cross-section of the profile, and which may be referred to hereinafter as an "irregular insert".

In accordance with an embodiment of the disclosure, the structural insert may be slidingly inserted through a first opening at one end of the profile along a whole length of the profile. Optionally, the structural insert may be inserted through the first opening, and a second structural insert may be inserted through a second opening at an opposing end of the profile, each structural insert extending only a portion of the length of the profile until they abut one another. The structural insert may comprise a carrier at one end adapted to drive the structural insert into the profile, and further adapted to pull the structural insert out of the profile after the injection overmolding is completed.

The profile is supported along an underside by supports which are removed when the overmolding material, which may be a plastic, partially, or wholly, covers the underside and exerts enough pressure on the profile to maintain a separation between the profile and the mold. Optionally, the supports are not removed so as to substantially prevent possible recesses in the molded plastic coating, which may expose the profile, in locations where the supports were used.

In accordance with an embodiment of the disclosure, the mold is adapted to restrain the plastic coated tube so as to allow the insert to be pulled out of the tube once the overmolding process is completed. The mold comprises a step into which a section of a perimeter at each end of the coated tube fits. A height of the step may be approximately equal to a thickness of the plastic coating and the profile wall thickness, or optionally less. When the insert is to be pulled out of the tube, the step acts as a barrier by pushing on the section of the perimeter at the tube end, and does not interfere with the insert removal. Optionally, the mold comprises a step for a section of the perimeter at one end of the tube.

In some embodiments of the disclosure, the structural insert may be fabricated from a material with a coefficient of thermal expansion greater than that of the profile. Once inserted into the profile, the hot temperatures of the molten plastic cause the insert to expand more than the profile, closing a relatively small clearance between the insert and the profile. Following injection of the molten plastic, the insert and profile are allowed to cool down, the insert contracting more than the profile to allow a relatively small clearance to develop. The insert may then be withdrawn. The relatively small clearance may be in the range from 0.05 mm-1 mm, for example 0.1 mm, depending on the material characteristics of the insert and the profile, and is adapted to allow the insert to be slidingly inserted and withdrawn.

There is provided, in accordance with an embodiment of the disclosure, a method for overmolding, comprising supporting essentially the entirety of an inner surface of a tube to be coated; and coating at least a portion of an outer surface of the tube by plastic injection overmolding. Optionally, overmolding comprises high pressure injection overmolding. Optionally, the method further comprises distributing forces exerted on the tube.

In some embodiments of the disclosure, supporting essentially the entirety of an inner surface of a tube to be coated, comprises supporting the tube by inserting at least one rod into said tube. Optionally, two rods are inserted into the tube. Optionally, a clearance between the at least one rod and the tube is less than 1 mm. Additionally or alternatively, the at least one rod is inserted through either end of the tube. Optionally, a first rod is inserted through one end of the tube, and a second rod is inserted through the other end of the tube.

In some embodiments of the disclosure, high pressure injection overmolding comprises injecting molten plastic at a pressure of 80-250 MPa. Optionally, molten plastic is injected at a pressure of 80-120 MPa. Optionally, molten plastic is injected at a pressure of 120-180 MPa. Optionally, molten plastic is injected at a pressure of 180-250 MPa.

In some embodiments of the disclosure, the method further comprises removing the rod from the tube following a cooling down period. Optionally, the cooling down period is 5 seconds or less.

There is provided in accordance with an embodiment of the disclosure, an apparatus for supporting a tube during plastic injection overmolding, the apparatus comprising at least one rod adapted to support essentially the entirety of an inner surface of a tube during at least a part of a plastic injection overmolding process for coating at least a portion of an outer surface of the tube. Optionally, the plastic injection overmolding process comprises high pressure injection overmolding. Optionally, the rod is adapted to distribute forces exerted on the tube.

In some embodiments of the disclosure, the at least one rod comprises two rods. Optionally, a clearance between the at least one rod and the tube is less than 1 mm. Optionally, a clearance between the at least one rod and the tube is less than 0.5 mm. Additionally or alternatively, a clearance between the at least one rod and the tube is less than 0.1 mm.

In some embodiments of the disclosure, the at least one rod is inserted into the tube from either end. Optionally, a first rod is inserted into the tube through one end of the tube and a second rod is inserted into the tube through the opposite end of the tube.

In some embodiments of the disclosure, molten plastic is injected at a pressure of 80-250 MPa. Optionally, molten plastic is injected at a pressure of 80-120 MPa. Optionally, molten plastic is injected at a pressure of 120-180 MPa. Optionally, molten plastic is injected at a pressure of 180-250 MPa.

In some embodiments of the disclosure, the at least one rod is removed from the tube following a cooling down period. Optionally, the cooling down period is 5 seconds or less.

In some embodiments of the disclosure, the rod is a rigid metal tube. Optionally, the rod comprises a circular, elliptical, quadrilateral, pentagonal, hexagonal, octagonal or other polygonal cross-section. Additionally or alternatively, the rod is solid tube. Optionally, the rod is adapted to resist temperatures up to about 300 degrees Celsius.

There is provided, in accordance with an embodiment of the disclosure, a system for facilitating plastic injection overmolding, the system comprising a rod adapted to support essentially the entirety of an inner surface of a tube during at least one stage of a plastic injection overmoulding process for coating at least a portion of an outer surface of the tube; and a carrier unit adapted to insert said rod into the tube and to remove said rod from the tube upon completion of the at least one stage of a plastic injection overmoulding process.

There is provided, in accordance with an embodiment of the disclosure, a plastic coated tube produced by a high pressure injection overmolding process comprising a metal profile of minimum wall thickness 0.1 mm; and a deformation amplitude in the profile of 1 mm or less.

There is provided, in accordance with an embodiment of the disclosure, an article of manufacture comprising plastic coated tubes produced by a high pressure injection molding process, wherein each tube comprises a metal profile of minimum wall thickness 0.1 mm and a deformation amplitude of 1 mm or less. Optionally, the article of manufacture is a storage shack. Optionally, the article of manufacture is a chair. Optionally, the article of manufacture is a table. Optionally, the article of manufacture is a building panel. Optionally, the article of manufacture is a window. Optionally, the article of manufacture is a door.

BRIEF DESCRIPTION OF FIGURES

Examples illustrative of embodiments of the disclosure are described below with reference to figures attached hereto. In the figures, identical structures, elements or parts that appear in more than one figure are generally labeled with a same numeral in all the figures in which they appear. Dimensions of components and features shown in the figures are generally chosen for convenience and clarity of presentation and are not necessarily shown to scale. The figures are listed below.

FIGS. 1A and 1B schematically show a top view and a side view, respectively, of an exemplary high pressure injection overmolding system, in accordance with an embodiment of the disclosure;

FIGS. 2A and 2B schematically show a top view and a side view, respectively, of an exemplary high pressure injection overmolding system, in accordance with another embodiment of the disclosure;

DETAILED DESCRIPTION

Figure 1C:
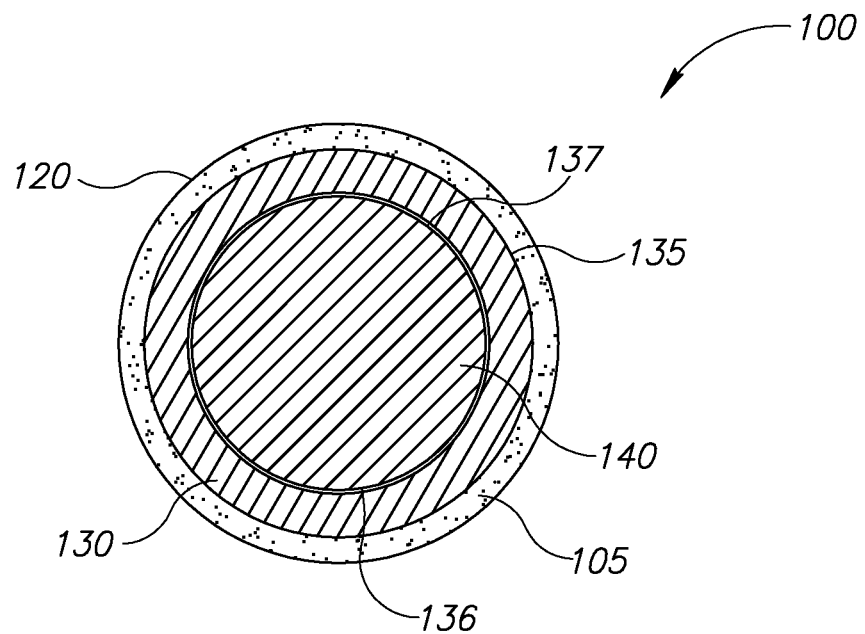
FIGS. 1C, 1D, and 1D' schematically show cross-sectional views A-A, B-B (inner cross section), and C-C, respectively, of the system of FIG. 1A comprising a round profile and a solid insert, in accordance with an embodiment of the disclosure.

Reference is made to FIGS. 1A and 1B which schematically show a top view and a side view, respectively, of an exemplary high pressure injection overmolding system 100, in accordance with an embodiment of the disclosure. Overmolding system 100 comprises a horizontal platform 110, a mold 120, profile supports 170, a structural insert 140, a first carrier 150, and a second carrier 160. The components comprised in overmolding system 100 are generally fabricated from a material adapted to resist the work environment encountered in a high pressure injection overmolding operation, for example, metals, metal alloys, ceramic materials, or others, or any combination thereof.

In accordance with an embodiment of the disclosure, structural insert 140 is attached at a first end 145 to first carrier 150, the first carrier adapted to slidingly push the structural insert into a profile 130. First carrier 150 is further adapted to slidingly withdraw insert 140 from profile 130. Following insertion of insert 140 through profile 130, the insert is attached to second carrier 160 at an opposing second end 146 of insert 140. Attachment of first end 145 and/or second end 146 to first carrier 150 and second carrier 160, respectively, may be by the use of nuts and bolts, or by any other mechanical means, or combination of means, suitable for performing the attachment. In some embodiments of the disclosure, insert 140 may be adapted with threads at first end 145 and/or second end 146 for fitting the insert unto threaded holes (not shown) in first carrier 150 and/or second carrier 160. Optionally, insert 140 may be integrally attached to first carrier 150 or second carrier 160 through welding.

In some embodiments of the disclosure, insert 140 may be first attached at second end 146 to second carrier 160 and then attached at first end 145 to first carrier 150 following insertion through profile 140. In some embodiments of the disclosure, insert 140 may be attached at only one end; either first end 145 or second end 146, to only one of the carriers, either first carrier 150 or second carrier 160, and the opposing end remains unattached to a carrier.

Horizontal platform 110 is adapted to receive first and second carriers 150 and 160, respectively, and insert 140, such that the insert may be slidingly pushed into profile 130 by carrier 150, or alternatively, by carrier 160. Horizontal platform 110 is generally substantially parallel to a floor (not shown). In some embodiments of the disclosure, horizontal platform 110 may be vertically oriented, perpendicular to a floor, or optionally, at an angle with the floor.

Arranged on horizontal platform 110 is mold 120, which comprises profile supports 170. Profile supports 170 are adapted to support profile 130 inside mold 120 during the overmolding process, a distance substantially equivalent to a thickness of a plastic coating on the profile. Profile supports 170 are adapted to be withdrawn from mold 120 when molten plastic injected into the mold is able to support a weight of profile 130. Profile supports 170 may be manually and/or optionally, automatically withdrawn. Comprised in mold 120 are one or more injectors (not shown) through which the molten plastic is injected into the mold during the overmolding process.

Figure 1D:
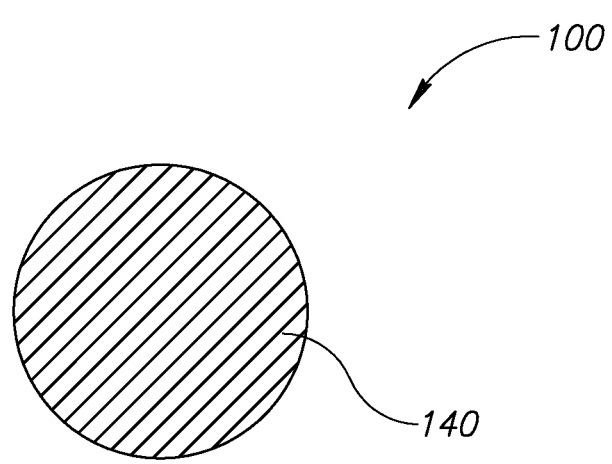
Figure 1D:
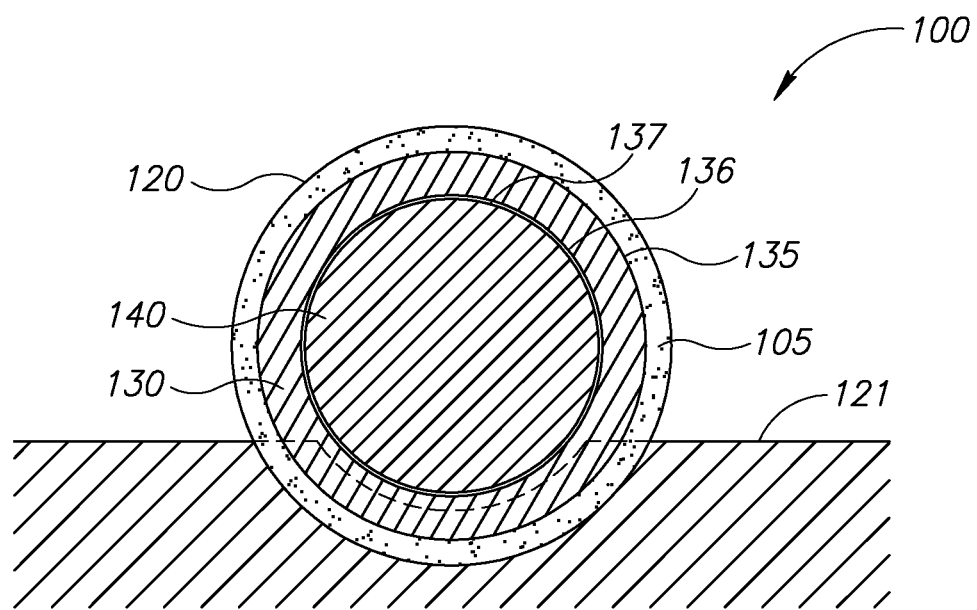

Reference is also made to FIG. 1C which schematically shows a cross-sectional view A-A of overmolding system 100, in accordance with an embodiment of the disclosure. Reference is also made to FIG. 1D which schematically shows a cross-sectional view B-B (inner cross-section) of overmolding system 100, in accordance with an embodiment of the disclosure. Profile 130 comprises a rigid, circular metal tube with a thin wall defined by an inner surface 136 and an outer wall 135, extending along the length of the profile. In accordance with an embodiment of the disclosure, wall thickness between outer surface 135 and inner surface 136 may be equal to or greater than 0.1 mm. In some embodiments of the disclosure, profile 130, which may hereinafter also be referred to as tube, may comprise a cross-section of substantially any geometrical shape, such as, for example, circular, elliptical, quadrilateral, pentagonal, hexagonal, heptagonal, octagonal, or other polygonal shape with more than eight sides, or any combination thereof.

Structural insert 140 may be fabricated from any material adapted to resist temperatures of, for example 230-250 degrees Celsius, and up to approximately 300 degrees Celsius, typically associated with high pressure injection overmolding processes. Examples of such materials may be metals, metal alloys, ceramics, composites, and others. In some embodiments of the disclosure, insert 140 may be shaped such that only a portion of the insert comprises a cross-sectional shape corresponding to an inner cross-section of profile 130, for example, a section the length of the profile that is placed inside the profile. The other sections may have a different cross-sectional shape and/or dimensions, and may be adapted for mating with corresponding mating sections in first carrier 150 and/or second carrier 160.

Profile 130 is shown inside mold 120 following the injection of molten plastic, as shown by plastic coating 105, and following withdrawal of profile supports 170. Structural insert 140 is shown inside of profile 130, following being slidingly inserted through the profile by first carrier 150, a relatively small clearance 137 existing between the insert and inside surface 136 to substantially prevent molten plastic from flowing into the clearance and possibly causing warps in the profile. Clearance 137 may be in the range between 0.05 mm and 1 mm, for example, 0.1 mm.

In accordance with an embodiment of the disclosure, mold 120 is adapted to restrain profile 130 to allow insert 140 to be pulled out of the tube once the overmolding process is completed. Reference is also made to FIG. 1D' which schematically shows a cross-sectional view C-C of overmolding system 100, in accordance with an embodiment of the disclosure. Mold 120 comprises a step 121 into which a section of a perimeter at each end of the profile 130 fits. A height of step 121 may be approximately equal to a thickness of plastic coating 105 and profile 130 wall thickness, or optionally less. Step 121 is adapted to acts as a barrier by pushing on the section of the perimeter at an end of tube 130 when insert 140 is to be pulled out of the tube, and is further adapted to not interfere with insert 140 removal. Optionally, mold 120 comprises a step 121 for a section of the perimeter at only one end of tube 130.

Figure 1E:
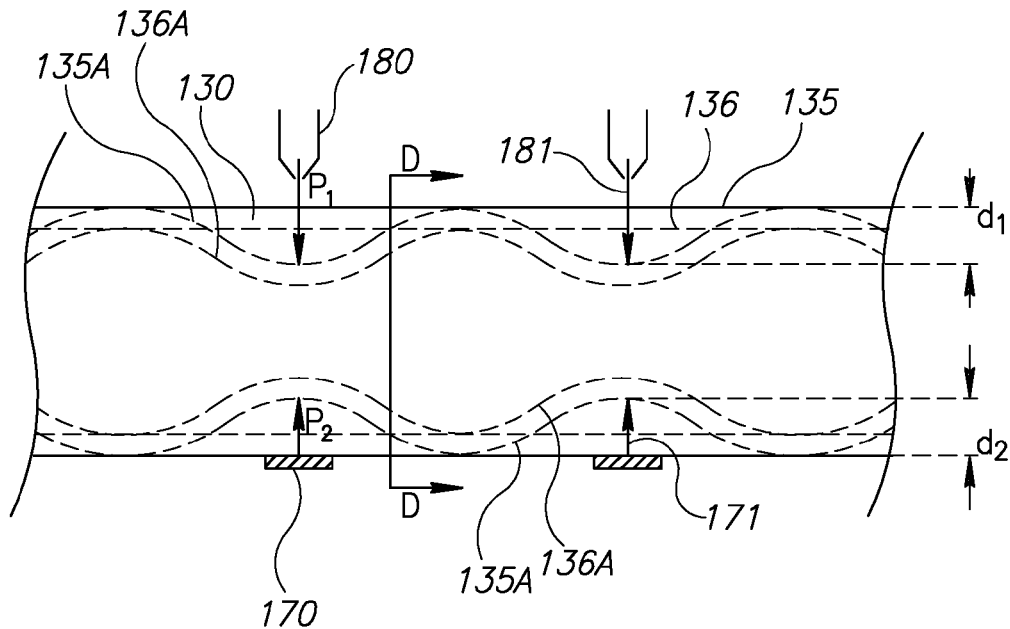
FIGS. 1E and 1F schematically show a sectional side view and a cross-sectional view D-D of the profile of FIG. 1C, respectively, comprising insufficient interior reinforcement during a high pressure injection molding process, as known in the art.
Figure 1F:
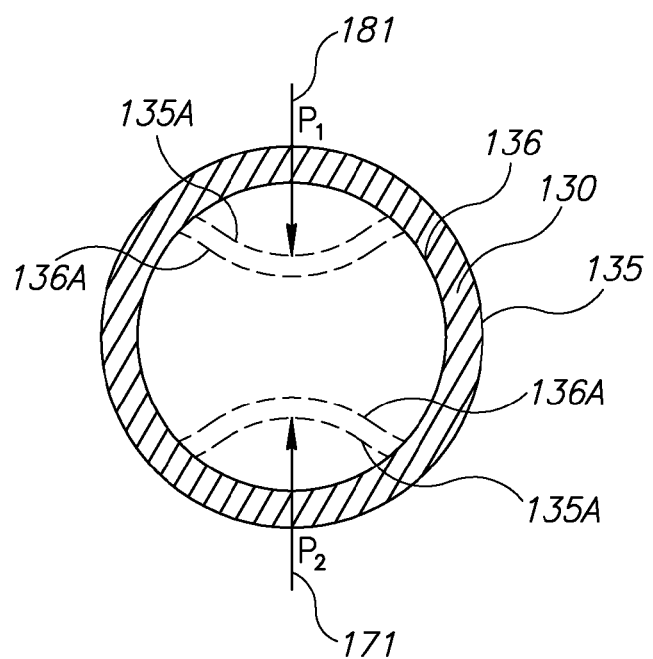

Reference is made to FIGS. 1E and 1F, which schematically show a sectional side view and a cross-sectional view D-D of profile 130, respectively, comprising insufficient interior reinforcement during a high pressure injection molding process; as known in the art. Molten plastic in streams at a relatively high pressure P1, shown by solid arrow 181, is ejected from injectors 180 towards a section of outer wall 135 of profile 130. The relative high pressure P1 causes the wall of profile 130 on the side of injectors 180 to deform with maximum deformation in areas under the injectors, the amplitude of the deformation shown by d1. Furthermore, pressure P1 pushes profile 130 toward supports 170, the supports exerting a relative high pressure P2, shown by solid arrow 171, against the wall of the profile on the side opposite P1. The relative high pressure P2 causes the wall of the profile 130 on the side of supports 170 to deform, with maximum deformation in areas in the proximity of the supports. The deformation of the wall is shown by inner wall 136A and outer wall 135A, and extends along a whole length, or optionally a portion of the length, of profile 130, the amplitude of the deformation shown by d2.

Figure 1G:
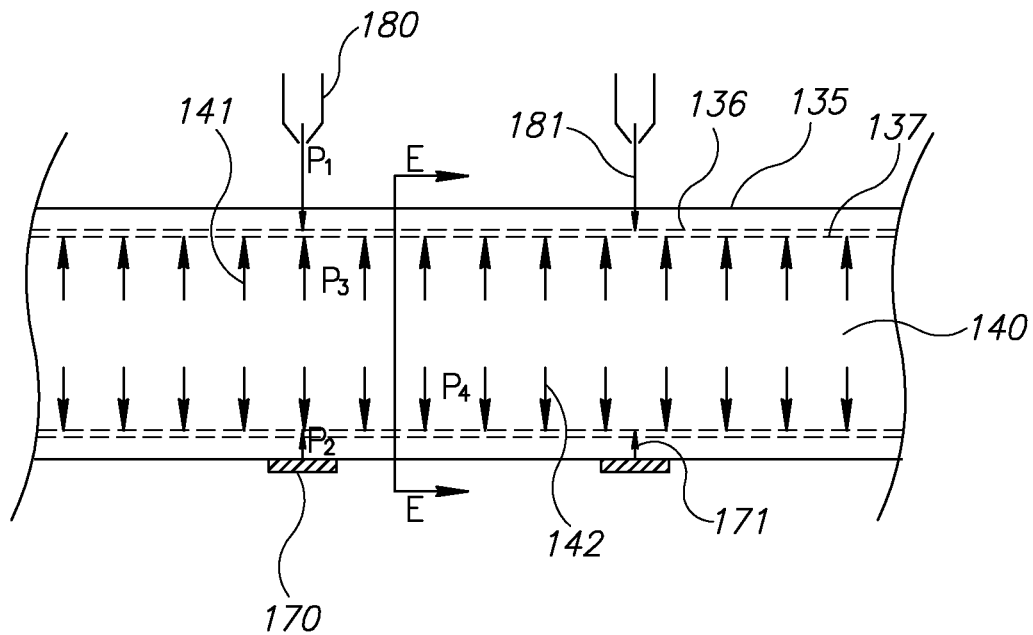
FIGS. 1G and 1H schematically show a sectional side view and a cross-sectional view E-E of the profile and the structural insert of FIGS. 1C and 1D, respectively, during a high pressure injection molding process, in accordance with an embodiment of the disclosure.
Figure 1H:
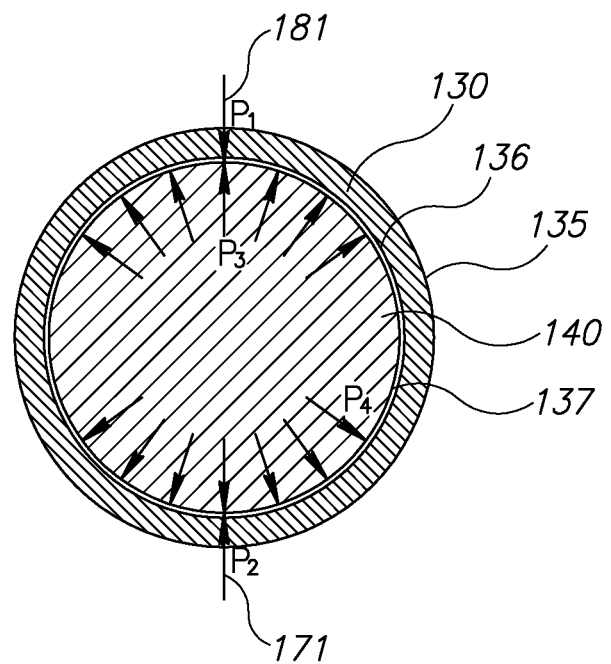

Reference is made to FIGS. 1G and 1H, which schematically show a sectional side view and a cross-sectional view E-E of profile 130 comprising structural insert 140, respectively, during a high pressure injection molding process, in accordance with an embodiment of the disclosure. Molten plastic in streams at a relatively high pressure P1, shown by solid arrow 181, is ejected from injectors 180 towards a section of outer wall 135 of profile 130. Furthermore, pressure P1 pushes profile 130 toward supports 170, the supports exerting a relative high pressure P2, shown by solid arrow 171, against the wall of the profile on the side opposite P1.

In accordance with an embodiment of the disclosure, structural insert 140 is adapted to distribute pressures (forces) P1 and P2 over the whole of, or optionally a portion of, the insert, such that deformation of the walls of profile 130 is substantially prevented (the deformation amplitude is relatively small, less than 1 mm) The opposing distributed forces, P3 and P4, shown by solid arrows 141 and 142, respectively, are substantially equal, and opposite in direction to the forces P1 and P2.

In some embodiments of the disclosure, insert 140 may be fabricated from a material which comprises a coefficient of thermal expansion greater than that of profile 130. The hot temperatures of the molten plastic causes insert 140 to expand more than profile 130, closing clearance 137 between the insert and the profile. Following injection of the molten plastic, insert 140 and profile 130 are allowed to cool down, the insert contracting more than the profile to allow a relatively small clearance to develop. Insert 140 may then be withdrawn. Clearance 137 may be in the range from 0.05 mm-1 mm, for example 0.1 mm, depending on the material characteristics of insert 140 and profile 130. Furthermore, structural insert 140 may be a circular, solid insert. Optionally, insert 140 may be a circular, non-solid insert. Optionally, structural insert 140 may be an irregular insert.

Reference is made to FIGS. 2A and 2B, which schematically show a top view and a side view, respectively, of an exemplary high pressure injection overmolding system 200, in accordance with another embodiment of the disclosure. Overmolding system 200 comprises a horizontal platform 210, a mold 220, a step 221, profile supports 270, a structural insert 240, a first carrier 250, and a second carrier 260. Horizontal platform 210, mold 220, step 221, profile supports 270, first carrier 250, and second carrier 260 are the same or substantially similar to those shown in FIGS. 1A and 1B at 110, 120, 121, 170, 150, and 160.

In accordance with some embodiments of the disclosure, structural inserts 240 and 241 are attached at a first end 245 and 246 to first carrier 250 and second carrier 260, respectively. First carrier 250 and second carrier 260 are adapted to slidingly push structural inserts 240 and 241, respectively, into profile 230. Profile 230 may be the same or substantially similar to that shown in FIGS. 1A and 1B at 130. Inserts 240 and 241 are inserted into profile 230 until second ends 247 and 248 on the inserts abut. Optionally, second ends 247 and 248 do not abut. First carrier 250 and second carrier 260 are further adapted to slidingly withdraw inserts 240 and 241, respectively, from profile 230.

Attachment of first ends 245 and 246 to first carrier 250 and second carrier 260, respectively, may be by the use of nuts and bolts, or by any other mechanical means, or combination of means, suitable for performing the attachment. In some embodiments of the disclosure, inserts 240 and/or 241 may be adapted with threads at first ends 245 and/or 246 for fitting the insert unto threaded holes (not shown) in first carrier 250 and/or second carrier 260. Optionally, inserts 240 and/or 241 may be integrally attached to first carrier 260 or second carrier 260, respectively, through welding.

Figure 3:
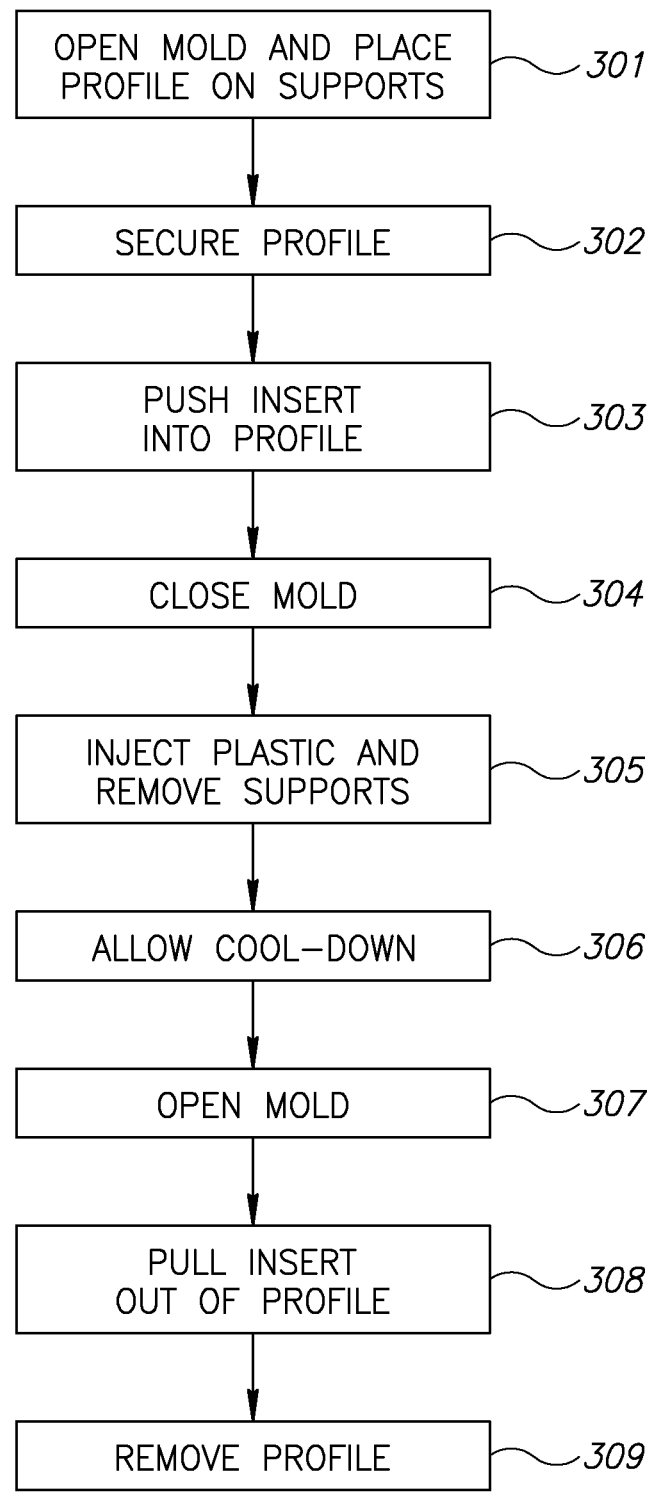
FIG. 3 shows a flow diagram of a method of performing high pressure injection overmolding using the high pressure injection overmolding system of FIG. 1A, in accordance with an embodiment of the disclosure.

Reference is made to FIG. 3, which shows a flow diagram of a method of performing high pressure injection overmolding using high pressure injection overmolding system 100 shown in FIGS. 1A and 1B, in accordance with an embodiment of the disclosure. Optionally, the method may be performed with high pressure injection overmolding system 200 shown in FIGS. 2A and 2B. It may be appreciated by a person skilled in the art that the method described herein may be applied in other sequences for the described embodiments, and may be applied in the same sequence described, or in other sequences, to other embodiments of the disclosure.

[STEP 301] Mold 120 is opened and profile 130 is placed on profile supports 170 inside the mold. A height of profile supports 170 is adjusted according to the thickness of plastic coating 105, and a number of profile supports is used, according to a weight of the profile and/or injection pressure.

[STEP 302] Profile 130 is secured inside mold 120

[STEP 303] Insert 140 is pushed through profile 130.

[STEP 304] Mold 120 is closed.

[STEP 305] Molten plastic is injected into mold 120. Profile supports 170 are removed when plastic coating 105 is capable of supporting the weight of profile 130.

[STEP 306] Following application of plastic coating 105 along an entire length of profile 130, injection of molten plastic is stopped and mold 120 is allowed to cool down for a period of time (cooling down period) ranging from 1 to 40 seconds, for example 5 to 20 seconds, 10 to 30 seconds, 20-40 seconds.

[STEP 307] Open mold 120.

[STEP 308] Slidingly withdraw insert 140 from profile 130.

[STEP 309] Remove profile 130 comprising plastic coating 105.

Figure 4:
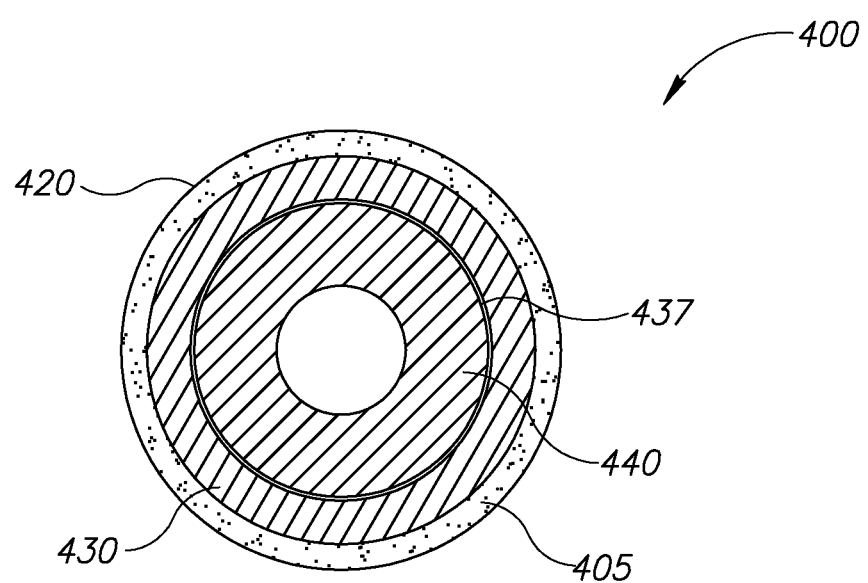
FIG. 4 schematically shows a cross-sectional view of a portion of a high pressure injection overmolding system comprising a round profile and a non-solid insert, in accordance with another embodiment of the disclosure.

Reference is made to FIG. 4, which schematically shows a cross-sectional view of a portion of a high pressure injection overmolding system 400 comprising a round profile 430 and a non-solid insert 440, in accordance with another embodiment of the disclosure. Profile 430 is shown inside mold 420 following injection of molten plastic, as shown by plastic coating 405. Structural insert 440 is shown inside profile 430, a relatively small clearance 437 separating between the profile and the insert. High pressure injection overmolding system 400, including profile 430, mold 420, insert 440, plastic coating 405, and clearance 437, may be the same or substantially similar to that shown in FIGS. 1A and 1B at 100, including 130, 120, 140, 105, and 137. Optionally, high pressure injection overmolding system 400, including profile 430, mold 420, insert 440, plastic coating 405, and clearance 437, may be the same or substantially similar to that shown in FIGS. 2A and 2B at 200, including 230, 220, 240, 205, and 237.

Figure 5:
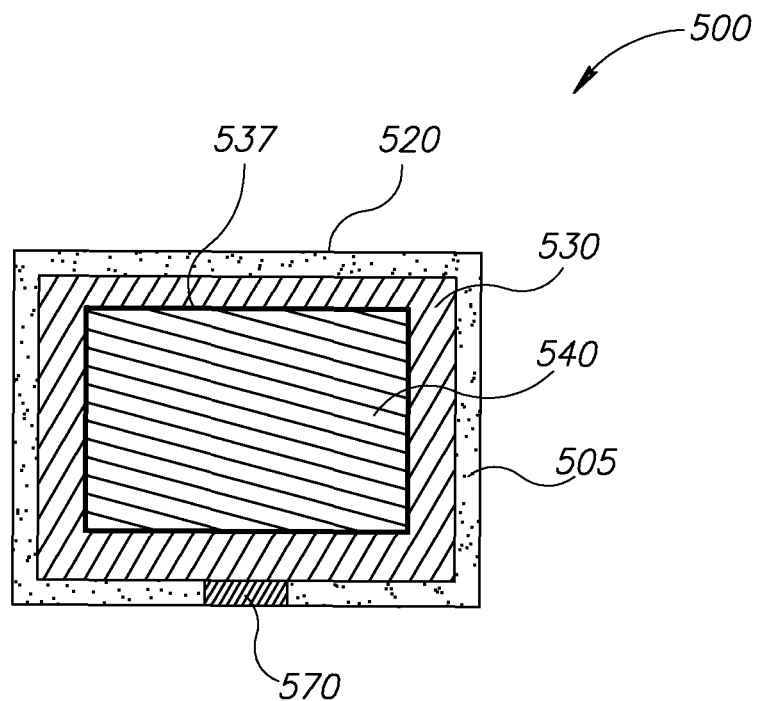
FIG. 5 schematically shows a cross-sectional view of a portion of a high pressure injection overmolding system comprising a quadrilateral profile and a solid insert, in accordance with another embodiment of the disclosure.

Reference is made to FIG. 5, which schematically shows a cross-sectional view of a portion of a high pressure injection overmolding system 500, comprising a quadrilateral profile 530 and a solid insert 540, in accordance with another embodiment of the disclosure. Profile 530 is shown inside mold 520 following injection of molten plastic, as shown by plastic coating 505. Structural insert 540 is shown inside profile 530, a relatively small clearance 537 separating between the profile and the insert. High pressure injection overmolding system 500, including profile 530, mold 520, insert 540, plastic coating 505, and clearance 537, may be the same or substantially similar to that shown in FIGS. 1A and 1B at 100, including 130, 120, 140, 105, and 137, except for variations pertaining to a shape of the profile and/or insert as shown in the figure. Optionally, high pressure injection overmolding system 500, including profile 530, mold 520, insert 540, plastic coating 505, and clearance 537, may be the same or substantially similar to that shown in FIGS. 2A and 2B at 200, including 230, 220, 240, 205, and 237, except for variations pertaining to a shape of the profile and/or insert as shown in the figure.

Figure 6:
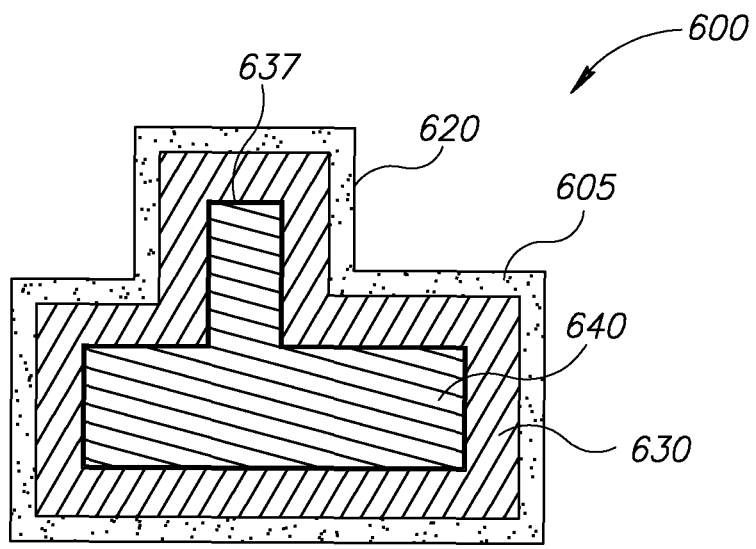
FIG. 6 schematically shows a cross-sectional view of a portion of a high pressure injection overmolding system comprising an octagonal profile and a solid insert, in accordance with another embodiment of the disclosure.

Reference is made to FIG. 6, which schematically shows a cross-sectional view of a portion of a high pressure injection overmolding system 600 comprising an octagonal profile 630 and a solid insert 640, in accordance with another embodiment of the disclosure.

Profile 630 is shown inside mold 620 following injection of molten plastic, as shown by plastic coating 605. Structural insert 640 is shown inside profile 630, a relatively small clearance 637 separating between the profile and the insert. High pressure injection overmolding system 600, including profile 630, mold 620, insert 640, plastic coating 605, and clearance 637, may be the same or substantially similar to that shown in FIGS. 1A and 1B at 100, including 130, 120, 140, 105, and 137, except for variations pertaining to a shape of the profile and/or insert as shown in the figure. Optionally, high pressure injection overmolding system 600, including profile 630, mold 620, insert 640, plastic coating 605, and clearance 637, may be the same or substantially similar to that shown in FIGS. 2A and 2B at 200, including 230, 220, 240, 205, and 237, except for variations pertaining to a shape of the profile and/or insert as shown in the figure.

Figure 7:
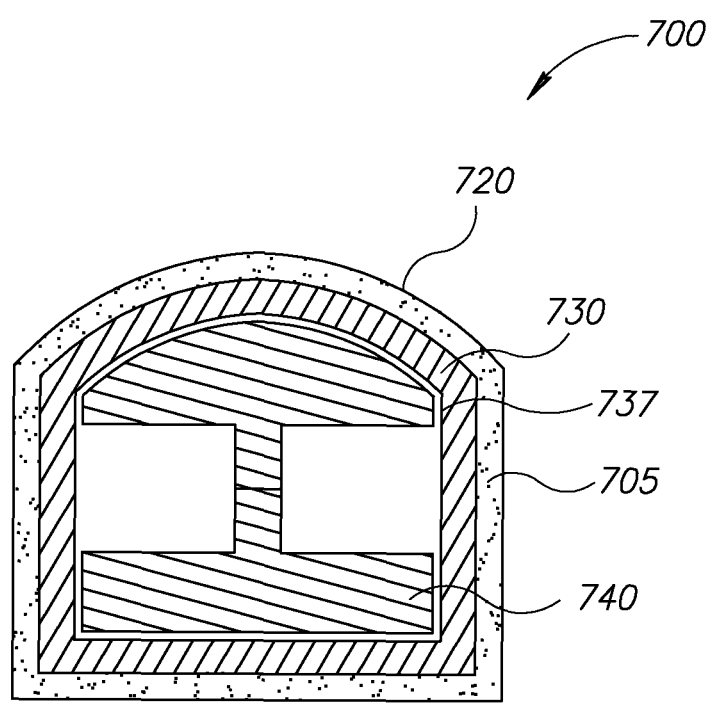
FIG. 7 schematically shows a cross-sectional view of a portion of a high pressure injection overmolding system comprising a curved-edge quadrilateral profile and an irregular insert, in accordance with another embodiment of the disclosure.

Reference is made to FIG. 7, which schematically shows a cross-sectional view of a portion of a high pressure injection overmolding system 700 comprising a curved-edge quadrilateral profile 730 and an irregular insert 740, in accordance with another embodiment of the disclosure. Profile 730 is shown inside mold 720 following injection of molten plastic, as shown by plastic coating 705. Structural insert 740 is shown inside profile 730, a relatively small clearance 737 separating between the profile and the insert. High pressure injection overmolding system 700, including profile 730, mold 720, insert 740, plastic coating 705, and clearance 737, may be the same or substantially similar to that shown in FIGS. 1A and 1B at 100, including 130, 120, 140, 105, and 137, except for variations pertaining to a shape of the profile and/or insert as shown in the figure. Optionally, high pressure injection overmolding system 700, including profile 730, mold 720, insert 740, plastic coating 705, and clearance 737, may be the same or substantially similar to that shown in FIGS. 2A and 2B at 200, including 230, 220, 240, 205, and 237, except for variations pertaining to a shape of the profile and/or insert as shown in the figure.

It may be appreciated by a person skilled in the art that the shapes of the profiles and inserts shown in the different embodiments are for illustrative purposes only, and are not intended to be limiting in any way. Numerous shapes of profiles and inserts may be used, an exemplary few shown herein.

In the description and claims of embodiments of the present disclosure, each of the words, "comprise" "include" and "have", and forms thereof, are not necessarily limited to members in a list with which the words may be associated.

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

The invention claimed is:

1. A method for high-pressure plastic injection overmolding, the method comprising:
   by utilizing a structural insert (140), supporting substantially an entirety of an inner surface of a profile (130) during a high pressure plastic injection overmolding, thereby coating at least a portion of an outer surface of the profile (130); and
   by utilizing multiple injectors (180), injecting streams of molten plastic at high pressure towards the profile (130),
   wherein in said injecting, each injector (180) is located perpendicularly to and in proximity to a first side of an outer wall (135) of the profile (130);
   wherein in said injecting, each injector (180) is directed towards a corresponding support element (170) which is located across an opposite side of the outer wall (135) of the profile (130);
   wherein in said injecting, each injector (180) is to inject molten plastic at a direction which is generally perpendicular to the longer dimension of the structural insert (140); wherein said injecting is performed while multiple injectors (180) and multiple corresponding support elements (170) are distributed along the longer dimension of the structural insert (140);
   wherein in said injecting,
   (A) each injector (180) is to generate a first force (P1) in a first direction towards the structural insert (140),
   (B) each support element (170) is to generate a second force (P2) in a second direction towards the structural insert (140), wherein the first force (P1) and the second force (P2) are directed at opposite directions,
   (C) the structural insert (140) is to generate a first opposing force (P3) equal to the first force (P1) and opposing the direction of the first force (P1),
   (D) the structural insert (140) is to generate a second opposing force (P4) equal to the second force (P2) and opposing the direction of the second force (P2),
   (E) the structural (140) is to distribute the forces (P1,P2) exerted on the profile (130);
   wherein the structural insert (140) has a coefficient of thermal expansion greater than that of the profile (130);
   wherein in said injecting, the injectors (180) stream hot molten plastic that cause the structural insert (140) to expand more than the profile (130) and to close a clearance (137) between the structural insert (140) and the profile (130);
   wherein upon cooling down, the structural insert (140) is to contract more than the profile (130) to develop a clearance (137) between the structural insert (140) and the profile (130), the clearance (137) allowing withdrawal of the structural insert (140) from the profile (130).

2. The method of claim 1, wherein utilizing the structural insert (140) comprises:
   inserting one rod through an end of the profile (130).

3. The method of claim 2, wherein a clearance between said one rod and the profile (130) is in a range of: between 0.05 millimeters to 1 millimeter.

4. The method of claim 2, wherein a clearance between said one rod and the profile (130) is less than 1 millimeter.

5. The method of claim 1, wherein utilizing structural insert (140) comprises:
   inserting two rods into the profile (130).

6. The method of claim 5, wherein inserting two rods into the profile (130) comprises:
   inserting a first rod through a first end of the profile (130); and inserting a second rod through a second, opposite, end of the profile (130).

7. The method of claim 1, comprising:
   distributing forces exerted on the profile (130).

8. The method of claim 1, wherein the injecting comprises:
   injecting molten plastic at a pressure selected from the group consisting of:
   80-250 MPa;
   80-120 MPa;
   120-180 MPa;
   180-250 MPa.

9. The method of claim 1, comprising:
   subsequent to cooling down period, removing said structural insert (140) from the profile (130).

10. The method of claim 9, wherein the cooling down period is 5 seconds or less.

11. The method of claim 1, wherein the injecting comprises:
    injecting molten plastic at a pressure of 80-120 MPa.

12. The method of claim 1, wherein the injecting comprises:
    injecting molten plastic at a pressure of 120-180 MPa.

* * * * *